United States Patent
Motooka et al.

[11] Patent Number: 5,600,498
[45] Date of Patent: Feb. 4, 1997

[54] PHOTOGRAPHIC PRINTING APPARATUS WITH IMPROVED COMPONENT SPACING

[75] Inventors: Eiji Motooka; Hiroshi Oku, both of Wakayama, Japan

[73] Assignee: Noritsu Koki Co., Ltd., Wakayama, Japan

[21] Appl. No.: 418,776

[22] Filed: Apr. 7, 1995

[30] Foreign Application Priority Data

| Apr. 7, 1994 | [JP] | Japan | 6-069572 |
| Apr. 7, 1994 | [JP] | Japan | 6-069573 |
| Apr. 7, 1994 | [JP] | Japan | 6-069574 |

[51] Int. Cl.[6] .................................. G11B 5/633
[52] U.S. Cl. .................................. 360/3; 355/41
[58] Field of Search .......... 360/3, 80, 74.1; 354/105, 106; 355/41; 369/96, 97

[56] References Cited

U.S. PATENT DOCUMENTS

| 4,987,431 | 1/1991 | Harvey | 354/21 |
| 5,347,403 | 9/1994 | Uekusa | 360/3 |
| 5,349,484 | 9/1994 | Koehler | 360/3 X |
| 5,432,586 | 7/1995 | Tokuda | 355/41 |
| 5,502,527 | 3/1996 | Kazami et al. | 360/3 X |

*Primary Examiner*—Andrew L. Sniezek
*Attorney, Agent, or Firm*— Wenderoth, Lind & Ponack

[57] ABSTRACT

A photographic printing apparatus includes an exposure station disposed in a midway region of a transfer path between a transfer inlet and a transfer outlet along which a negative film having magnetic recording tracks provided thereon is transferred forwardly and backwardly. A magnetic read head disposed between the transfer inlet and the exposure station, the magnetic read head being spaced from a center line of the exposure station by a distance which is equal to a sum of an integer multiple of the pitch length of one frame on the negative film and a half of the same.

17 Claims, 8 Drawing Sheets

PHOTOGRAPHIC PRINTING APPARATUS WITH IMPROVED COMPONENT SPACING

BACKGROUND OF THE INVENTION

The present invention relates to a photographic printing apparatus capable of reading and writing data on magnetic recording tracks on a negative film.

A common photographic printing apparatus is designed for scanning and printing images on a negative film transferred at equal intervals of time.

Also in the common photographic printing apparatus, the negative film has to be advanced at a constant speed for carrying out the reading and writing of data on its magnetic recording tracks without fault.

For allowing both exposure and reading operations in parallel, the common photographic printing apparatus has a film loop section disposed between an exposure station and a magnetic head.

The film loop section however requires a considerable size of space for installation in the photographic printing apparatus. This will increase the overall size of the common photographic printing apparatus, thus limiting the available space of a small sized print shop.

Another conventional photographic printing apparatus is provided with a means of forward and backward movements of a negative film so that the exposure and scanning operations are executed during intermittent transfer of the film and the operations of reading and writing of data are conducted during constant speed transfer thereof.

The forward and backward movements of the negative film will however take a considerable length of time, although the film loop section of the previous apparatus is not needed. Those movements may also cause the negative film to be injured.

It is an object of the present invention, in view of the above description, to provide an improved photographic printing apparatus in which the reading and writing of data on a negative film are carried out with accuracy without, the use of a traditional film loop section but with a minimum number of forward and backward transfer movements.

SUMMARY OF THE INVENTION

A photographic printing apparatus according to the present invention includes an exposure station disposed in a midway region of a transfer path between a transfer inlet and a transfer outlet along which a negative film having magnetic recording tracks provided thereon is transferred forwardly and backwardly. A magnetic read head is disposed between the transfer inlet and the exposure station. In particular, the magnetic read head is spaced from a center line of the exposure station by a distance which is equal to a sum of an integer multiple of the pitch length of one frame on the negative film and a half of the same.

The photographic printing apparatus further includes a magnetic write head disposed between the exposure station and the transfer outlet. The magnetic write head is also spaced from the center line of the exposure station by a distance which is equal to a sum of an integer multiple of the pitch length of the frame on the negative film and a half of the same.

The photographic printing apparatus may include a transfer path extending from a transfer inlet to a transfer outlet for transfer movements of a negative film which has magnetic recording tracks provided thereon and an exposure station disposed in a midway region of the transfer path, in which the negative film is scanned during its intermittent forward transfer movement from the transfer inlet towards the exposure station and is subjected to printing during its backward transfer movement towards the transfer inlet. Specifically, the apparatus of the present invention includes a magnetic read head disposed between the transfer inlet and the exposure station, the magnetic read head being spaced from the center line of the exposure station by a distance which is equal to a sum of an integer multiple of the pitch length of one frame on the negative film and a half of the same.

Such photographic printing apparatus further includes a magnetic write head disposed between the transfer inlet and the exposure station, the magnetic write head being spaced from the magnetic read head by a distance which is equal to a sum of an integer multiple of the pitch length of the frame on the negative film and a half of the same.

The photographic printing apparatus may include a transfer path extending from a transfer inlet to a transfer outlet for forward and backward transfer movements of a negative film which has magnetic recording tracks provided thereon and an exposure station disposed in a midway region of the transfer path, in which the negative film is scanned during its intermittent forward transfer movement from the transfer inlet towards the exposure station and resultant scanned data are processed to the end during the continuous backward transfer movement of the negative film towards the transfer inlet before the negative film being once again transferred forwardly in intermittent movement to the exposure station for printing. In particular, the apparatus of the present invention includes a read head disposed between the transfer inlet and the exposure station, such magnetic read head being spaced from the center line of the exposure station by a distance which is equal to a sum of an integer multiple of the pitch length of one frame on the negative film and a half of the same.

Such photographic printing apparatus may include a magnetic write head disposed between the transfer inlet and the exposure station for writing of data onto the negative film during the continuous backward transfer movement of the same.

Such photographic printing apparatus may include a magnetic write head disposed between the transfer inlet and the exposure station for writing of data onto the negative film during the continuous forward transfer movement of the same. Such magnetic write head is spaced from the magnetic read head by a distance which is equal to a sum of an integer multiple of the pitch length of the frame on the negative film and a half of the same.

The photographic printing apparatus may include a transfer path extending from a transfer inlet to a transfer outlet for forward and backward transfer movements of a negative film which has magnetic recording tracks provided thereon and an exposure station disposed in a midway region of the transfer path, in which the negative film is scanned during its intermittent forward transfer movement from the transfer inlet towards the exposure station and resultant scanned data are processed to the end during the continuous backward transfer movement of the negative film towards the transfer inlet before the negative film being once again transferred forwardly to the exposure station for printing and then, backwardly towards the transfer inlet in continuous movement. The apparatus of the present invention comprises a read head disposed between the transfer inlet and the exposure station for reading data from the recording tracks on the negative film during the intermittent backward transfer movement of the negative film. Also, the magnetic read head is spaced from the center line of the exposure station by a distance which is equal to a sum of an integer multiple of the pitch length of one frame on the negative film and a half of the same.

Such photographic printing apparatus may include a magnetic write head disposed between the transfer inlet and the exposure station for writing of data, after printing, onto the negative film during the continuous backward transfer movement of the same.

The magnetic write head may be located upstream of the magnetic read head in the backward transfer movement.

The magnetic write head may be located upstream of the magnetic read head in the forward transfer movement.

The photographic printing apparatus may include a scanner unit and a printer unit disposed in this order from an upstream direction along a transfer path extending from a transfer inlet to a transfer outlet for transfer movements of a negative film which has magnetic recording tracks provided thereon. Said scanner unit includes a detector for detecting film mode data, e.g. the size of frames and the film type, and another detector for detecting frame image data by scanning with a scanner light source. The printer unit includes a printer light source and a light control filter for color adjustment which are actuated by means of detected data of the scanner unit for printing at an exposure station. The apparatus includes a magnetic read head disposed across the transfer path in the scanner unit, such magnetic read head being spaced from the center line of the scanner light source by a distance which is equal to a sum of an integer multiple of the pitch length of one frame on the negative film and a half of the same.

Such photographic printing apparatus may include a magnetic write head disposed across the transfer path upstream of the exposure station in the printer unit. The magnetic write head is spaced from the center line of the exposure station by a distance which is equal to a sum of an integer multiple of the pitch length of the frame on the negative film and a half of the same.

Such photographic printing apparatus may include a magnetic write head disposed across the transfer path downstream of the exposure station in the printer unit. The magnetic write head is spaced from the center line of the exposure station by a distance which is equal to a sum of an integer multiple of the pitch length of the frame on the negative film and a half of the same.

The photographic printing apparatus may include a transfer path extending from a transfer inlet to a transfer outlet for forward and backward transfer movements of a negative film which has a magnetic recording track and a latent image pattern provided and assigned to each frame thereon and an exposure station disposed in a midway region of the transfer path. The apparatus may include a magnetic read head, a magnetic write head, and an optical sensor. The magnetic read head, magnetic write head, and optical sensor are disposed across the transfer path in this order from the transfer inlet. In particular, the magnetic read head is spaced from the center line of the exposure station by a distance which is equal to a sum of an integer multiple of the pitch length of one frame on the negative film and a half of the same. The optical sensor is also spaced from the center line of the exposure station by a distance which is equal to a sum of an integer multiple of the pitch length of the frame on the negative film and a half of the same. In action, the negative film is scanned and read with the optical sensor and the magnetic read head for acquisition of data during its intermittent forward transfer movement towards the transfer outlet and is written with the magnetic write head for storage of data in its magnetic recording tracks during its continuous backward transfer movement towards the transfer inlet.

The photographic printing apparatus allows the magnetic read head to be spaced from the center line of the exposure station by the distance which is equal to the sum of an integer multiple of the pitch length of one frame on the negative film and a half of the same. After a cycle of its intermittent transfer movement, the negative film comes to a pause at the exposure station with its target frame being located just across the center line, allowing the magnetic read head to stand between two adjacent magnetic recording tracks of other frames. When the intermittent transfer movement starts again, the magnetic recording track of the latter frame is successfully scanned by the read head for reading of data. Accordingly, the data stored in the magnetic recording tracks can explicitly be read during the intermittent forward transfer movement of the negative film.

The photographic printing apparatus allows the magnetic write head to be spaced from the center line of the exposure station by the distance which is equal to the sum of an integer multiple of the pitch length of one frame on the negative film and a half of the same. After a cycle of its intermittent transfer movement, the negative film comes to a pause at the exposure station with its target frame being located just across the center line, allowing the magnetic write head to be between two adjacent magnetic recording tracks of other frames. When the intermittent transfer movement starts again, the magnetic recording track of the latter frame is successfully scanned by the write head for writing of data. Accordingly, any wanted data can definitely be written into the magnetic recording track during the intermittent forward transfer movement of the negative film for the printing.

In operation of the photographic printing apparatus, when a cycle of the intermittent transfer movement is ceased, the negative film comes to a pause at the exposure station with its target frame being located just across the center line, allowing the magnetic read head to stand between two adjacent magnetic recording tracks of other frames. As the intermittent transfer movement starts again, the magnetic recording track of the latter frame is successfully scanned by the read head for reading of data.

Accordingly, the data stored in the magnetic recording tracks can explicitly be read during the intermittent forward transfer movement of the negative film for scanning.

This action will be followed by the printing operation during the continuous backward transfer movement of the negative film.

In operation the photographic printing apparatus, when a cycle of the intermittent transfer movement is ceased, the negative film comes to a pause at the exposure station with its target frame being located just across the center line, allowing the magnetic write head to stand between two adjacent magnetic recording tracks of other frames. As the intermittent transfer movement starts again, the magnetic recording track of the latter frame is successfully scanned by the write head for writing of data.

Accordingly, after recorded data on the negative film is scanned and read explicitly by the read head during the intermittent forward transfer movement, any desired data can definitely be written into the magnetic recording tracks during the intermittent backward transfer movement of the negative film for the printing.

In operation of the photographic printing apparatus, the magnetic recording track of one frame is successfully scanned by the magnetic read head during the intermittent transfer movement of the negative film. Accordingly, the data stored in the magnetic recording tracks can explicitly be read during the intermittent forward transfer movement of the negative film for scanning.

During the continuous backward transfer movement of the negative film, the processing of scanned data is completed.

Finally, the negative film is once again transferred forwardly in intermittent movement for printing.

In operation of the photographic printing apparatus, the magnetic recording track of one frame is successfully scanned by the magnetic read head during the intermittent forward transfer movement of the negative film.

Then, as the negative film is transferred backwardly in continuous movement, the processing of scanned data is completed and simultaneously wanted data is written into the magnetic recording tracks.

Finally, the negative film is once again transferred forwardly in intermittent movement for printing.

In operation of the photographic printing apparatus, the magnetic recording track of one frame is successfully scanned by the magnetic read head during the intermittent forward transfer movement of the negative film.

As the negative film is transferred backwardly in continuous movement, the processing of scanned data is completed.

Finally, the negative film is once again transferred forwardly in intermittent movement for printing and also desired data is written on to the negative film.

In operation of the photographic printing apparatus, the magnetic recording track of one frame is successfully scanned by the magnetic read head during the intermittent forward transfer movement of the negative film.

As the negative film is transferred backwardly in continuous movement, the processing of scanned data is completed.

Then, the negative film is once again transferred forwardly in intermittent movement for printing.

Finally, the continuous backward transfer movement of the negative film is conducted.

In operation of the photographic printing apparatus, the magnetic recording track of one frame is successfully scanned by the magnetic read head during the intermittent forward transfer movement of the negative film.

As the negative film is transferred backwardly in continuous movement, the processing of scanned data is completed.

Then, the negative film is once again transferred forwardly in intermittent movement for printing.

Finally, as the continuous backward transfer movement of the negative film is conducted, any desired data can be written into the recording tracks.

The magnetic read head can examine data written with the magnetic write head.

In operation of the photographic printing apparatus, when a cycle of the intermittent transfer movement is ceased, the negative film may come to a pause in the scanner unit with its target frame being located just across the center line of the scanner light source, allowing the magnetic read head to stand between two adjacent magnetic recording tracks of other frames. As the intermittent transfer movement starts again, the magnetic recording track of the latter frame is successfully scanned by the read head for reading of data.

In operation of the photographic printing apparatus, when a cycle of the intermittent transfer movement is ceased, the negative film may come to a pause at the exposure station with its target frame being located just across the center line, allowing the magnetic write head to stand between two adjacent magnetic recording tracks of other frames. As the intermittent transfer movement starts again, the magnetic recording track of the latter frame is successfully scanned by the write head for writing of data.

As the write head is located downstream of the exposure station, extra data of correction for the printing action can definitely be written.

The photographic printing apparatus allows each of the magnetic read head and the optical sensor to be spaced from the center line of the exposure station by the distance which is equal to the sum of an integer multiple of the pitch length of one frame on the negative film and a half of the same. After a cycle of its intermittent transfer movement, the negative film comes to a pause at the exposure station with its target frame being located just across the center line, allowing both the magnetic read head and the optical sensor to stay in no data spaces between the recording tracks and data storage regions on the negative film. When the intermittent transfer movement starts again, the magnetic recording track of each frame is successfully scanned by the read head for reading of data.

As the negative film is transferred backwardly in continuous movement after the reading of data, it can also be scanned successfully by the write head allowing any desired data to be written into its magnetic recording tracks.

DETAILED DESCRIPTION OF THE PREFERRED EMBODIMENTS

EMBODIMENT 1

Figure 1:
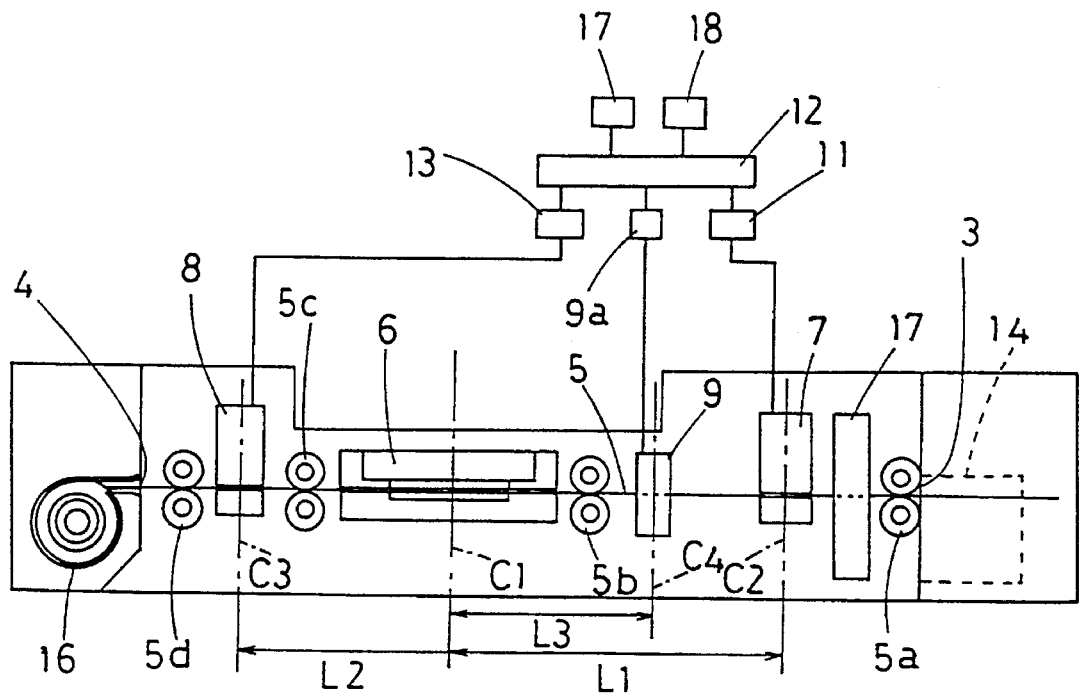
FIG. 1 is a front view of a photographic printing apparatus showing Embodiment 1 of the present invention.
Figure 2:
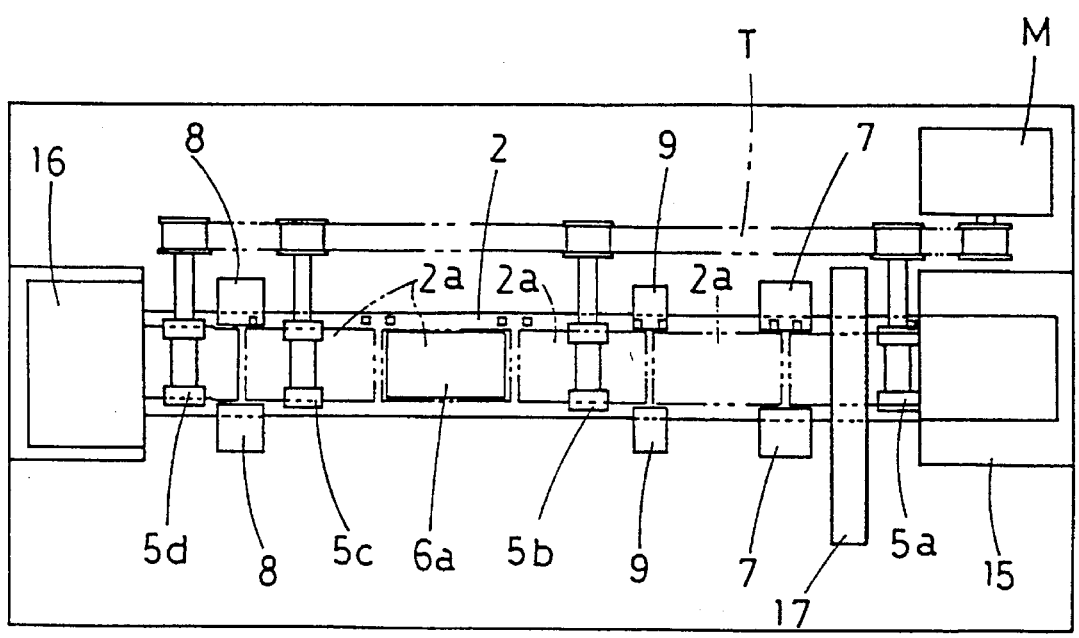
FIG. 2 is a plan view of the same.

A photographic printing apparatus of Embodiment 1 of the present invention comprises an exposure station 6, a magnetic read head 7, a magnetic write head 8, and an optical sensor 9 arranged along a transfer path 5 which extends from a transfer inlet 3 to a transfer outlet 4 for forward and backward movements of a negative film 2 (FIGS. 1 and 2).

The transfer path 5 includes a pair of transfer rollers 5a disposed adjacent to the transfer inlet 3, a pair of transfer rollers 5b disposed on the inlet 3 side of the exposure station 6, and two pairs of transfer rollers 5c and 5d disposed adjacent to the transfer outlet 4.

The transfer rollers 5a, 5b, 5c, and 5d are driven by a motor M through a transmission means T for synchronous rotation.

The transfer path 5 is arranged such that the negative film 2 is advanced from the inlet 3 to the outlet 4 by the forward rotation of the motor M and conveyed backward from the outlet 4 to the inlet 3 by the reverse rotation of the motor M.

During forward transfer, the negative film 2 is intermittently passed across the exposure station 6 on a frame-by-frame basis. After the negative film 2 is returned during the backward transfer movement, it is continuously conveyed towards the outlet 4 at a constant speed.

Figure 4:
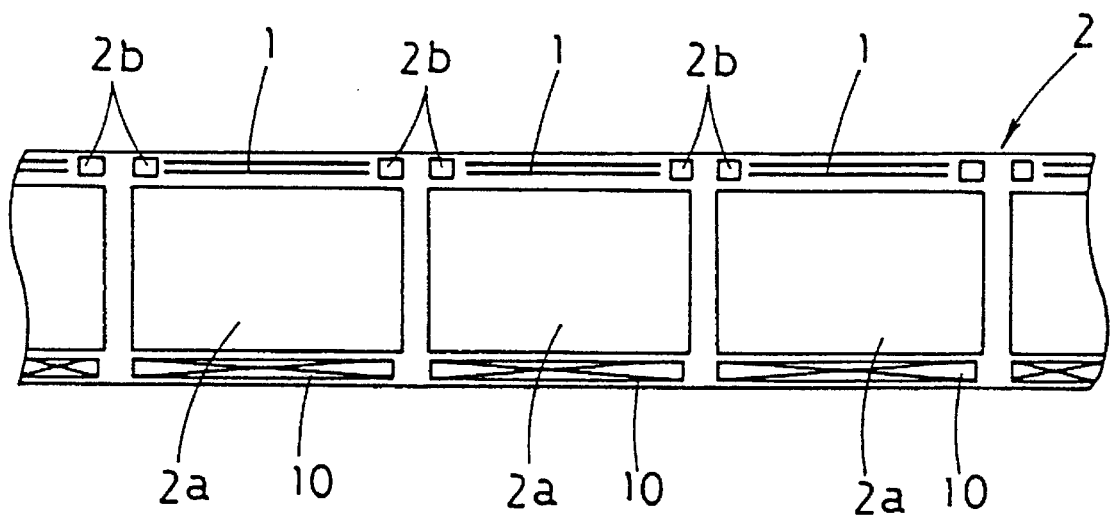
FIG. 4 is a plan view of the negative film.

FIG. 4 is a plan view of the negative film 2 on which magnetic recording tracks 1 are aligned in a row. Each of the magnetic recording tracks 1 is assigned to one frame 2a and carries shooting data of the frame 2a such as the date and time.

The negative film 2 has a series of perforations 2b disposed in one edge thereof. More particularly, each two perforations 2b are located at opposite ends of the recording track 1 and on one side of the frame 2a.

A row of latent image patterns 10 are printed on the other edge of the negative film 2, each pattern assigning to a frame 2a.

The magnetic read head 7 is provided for reading data recorded in the magnetic recording tracks 1 on the negative film 2 and is located across the transfer path 5 between the transfer inlet 3 and the exposure station 6. The magnetic read head 7 is electrically connected by a read circuit 11 to a controller 12.

A distance L1 between a center line C2 of the read head 7 and a center line C1 of the exposure station 6 is equal to a sum of an integer multiple of the pitch length of the frame 2a on the negative film 2 and a half of the same, and more particularly, is set to a length of 2.5 frames in this embodiment.

The magnetic write head 8 is provided to write shooting data into the magnetic recording tracks 1 on the negative film 2 and is located across the transfer path 5 between the exposure station 6 and the transfer outlet 4. The magnetic write head 8 is electrically connected by a write circuit 13 to the controller 12.

A distance L2 between the center line C1 of the exposure station 6 and a center line C3 of the write head 8 is equal to a sum of an integer multiple of the pitch length of the frame 2a on the negative film 2 and a half of the same, and more particularly, is set to a length of 1.5 frames in this embodiment.

The optical sensor 9 is provided for detecting the perforations 2b and the latent image patterns 10 and is located between the read head 7 and the exposure station 6. The optical sensor 9 is electrically connected by an amplifier circuit 9a to the controller 12.

A distance L3 between a center line C4 of the optical sensor 9 and the center line C1 of the exposure station 6 is equal to a sum of an integer multiple of the pitch length of the frame 2a on the negative film 2 and a half of the same, and more particularly, is set to the length of 1.5 frames in this embodiment.

The controller 12 is also connected to a keyboard 17 and a display 18.

The exposure station 6 is provided to expose each frame 2a on the negative film 2 loaded at an exposure stage 6a to a beam of light for printing its image on a print paper (not shown).

Figure 3:
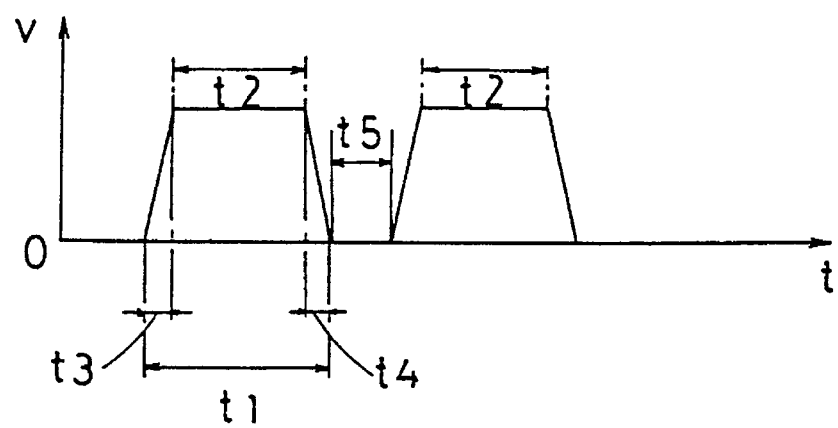
FIG. 3 is a diagram showing a variation of the intermittent transfer movement speed of a negative film with time.

FIG. 3 illustrates a variation of the speed v of the intermittent transfer movement of the negative film 2 with time t, where t1 is a duration of advancing one frame, t2 is a period of movement at the constant speed, t3 is a period of acceleration for starting frame advancing, t4 is a period of deceleration for stopping frame advancing, and t5 is a duration of no movement of frame advancing. The read action with the read head 7 and the write action with the write head 8 are carried out during the period t2 where the frames on the film 2 are advanced at the constant speed.

There are a cartridge holder 15 for holding a film cartridge 14 and a film takeup 16 disposed on the start and finish ends of the transfer path 5 respectively.

In addition, a film cleaner 17 is provided as shown in FIG. 1 or 2.

The steps of operation in the photographic printing apparatus of Embodiment 1 will now be explained where the reading and writing of data can be executed at a high accuracy while the exposure arid scanning actions are conducted in a known manner.

(1) As the negative film 2 is drawn out from its cartridge 14 and transferred forwardly at intervals of time, its shooting data are read by the magnetic read head 7 while its patterns are scanned by the optical sensor 9.

(2) Then, the negative film 2 is transferred backward at the constant speed while the read and write heads 7, 8 remain inactivated.

(3) As the negative film 2 is transferred forwardly again at equal intervals of time, the printing action at the exposure station 6 and the writing of printing data into the magnetic recording tracks 1 with the write head 8 are carried out.

The steps of this operation are completed when the negative film 2 has been transferred forwardly and backwardly in a 1.5 stroke movement.

EMBODIMENT 2

Figure 5:
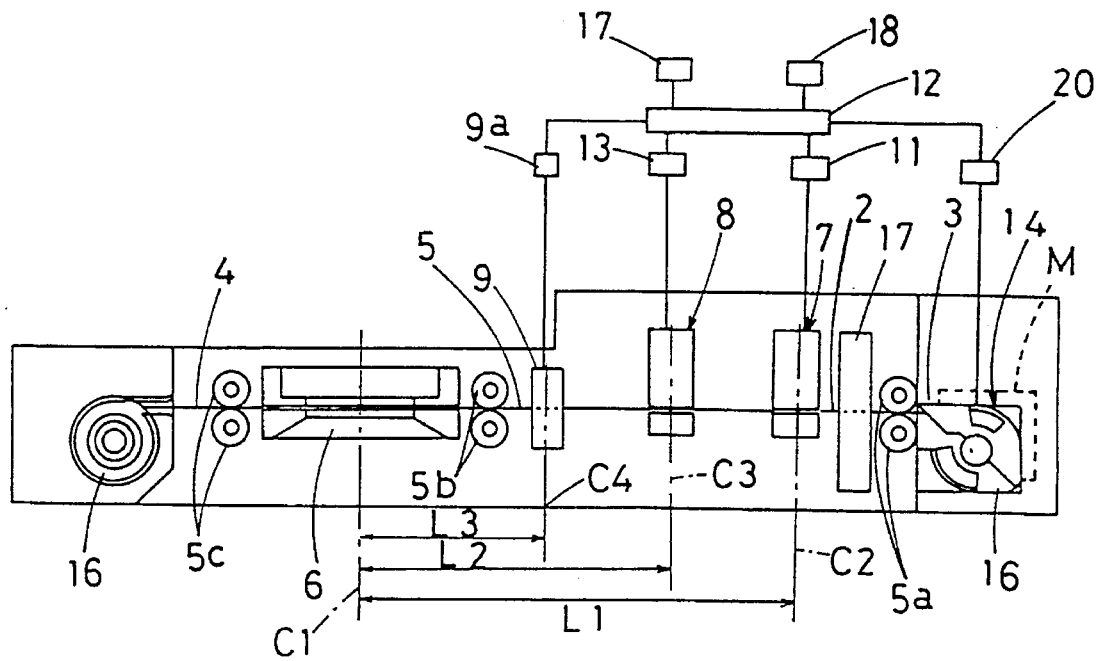
FIG. 5 is a front view of a photographic printing apparatus showing Embodiment 2 of the present invention.
Figure 6:
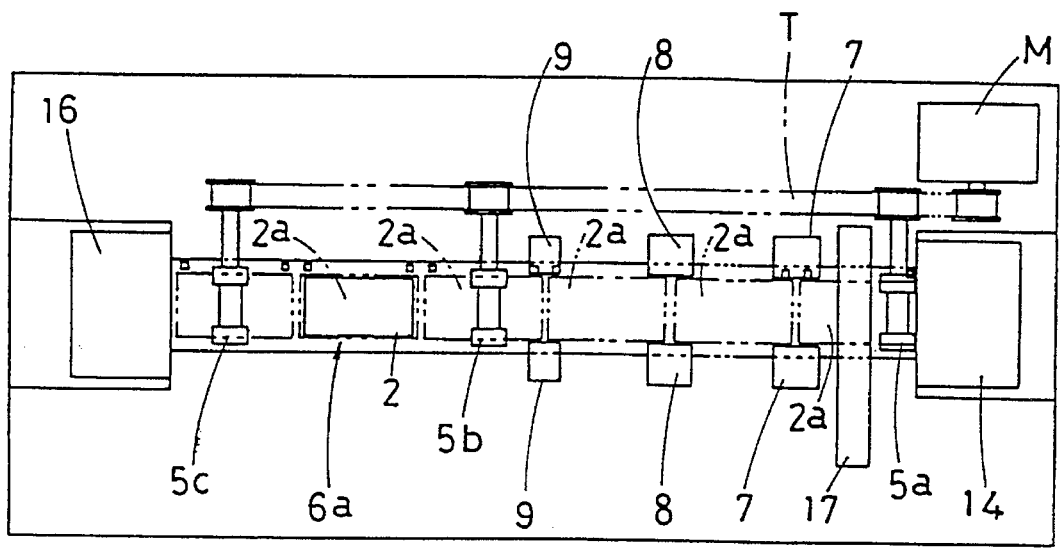
FIG. 6 is a plan view of the same.

A photographic printing apparatus according to Embodiment 2 of the present invention comprises an exposure station 6, a magnetic read head 7, a magnetic write head 8, and an optical sensor 9 arranged along a transfer path 5 which extends from a transfer inlet 3 to a transfer outlet 4 for forward and backward movements of a negative film 2 which has a row of magnetic recording tracks 1 provided thereon (FIGS. 5 and 6).

The transfer path 5 includes a pair of transfer rollers 5a disposed adjacent to the transfer inlet 3, a pair of transfer rollers 5b disposed on the inlet 3 side of the exposure station 6, and a pair of transfer rollers 5c disposed adjacent to the transfer outlet 4.

The transfer rollers 5a, 5b, and 5c are driven by a motor M through a transmission means T for synchronous rotation actions.

The transfer path 5, similar to that of Embodiment 1, is arranged such that the negative film 2 is advanced from the inlet 3 to the outlet 4 by the forward rotation of the motor M and conveyed backward from the outlet 4 to the inlet 3 by the reverse rotation of the motor M. During forward transfer, the negative film 2 is passed intermittently to the exposure station 6 on a frame-by-frame basis. After the negative film 2 is returned during backward transfer movement, it is continuously conveyed towards the outlet 4 at a constant speed.

The motor M is electrically connected by a driver 2b to a controller 12.

The negative film 2 is identical in construction to that shown in FIG. 4.

The magnetic read head 7 is identical to that of Embodiment 1 for reading data recorded in the magnetic recording tracks 1 on the negative film 2 and located across the transfer path 5 between the transfer inlet 3 and the exposure station 6. The magnetic read head 7 is electrically connected by a read circuit 11 to the controller 12.

A distance L1 between the center line C2 of the read head 7 and the center line C1 of the exposure station 6 is equal to a sum of an integer multiple of the pitch length of the frame 2a on the negative film 2 and a half of the same, and more particularly, is set to a length of 3.5 frames in this embodiment.

Equally, the magnetic write head 8 is provided for writing shooting data into the magnetic recording tracks 1 on the negative film 2 and is located across the transfer path 5 between the transfer inlet 3 and the exposure station 6. The magnetic write head 8 is electrically connected by a write circuit 13 to the controller 12. A distance L2 between the center line C3 of the write head 8 and the center line C1 of the exposure station 6 is equal to a sum of an integer multiple of the pitch length of the frame 2a on the negative film 2 and a half of the same, and more particularly, is set to the length of 2.5 frames in this embodiment.

The optical sensor 9 is equally arranged for detecting the perforations 2b and the latent image patterns 10 of the negative film 2 and is located between the read head 7 and the exposure station 6. The optical sensor 9 is electrically connected by an amplifier circuit 9a to the controller 12.

A distance L3 between the center line C4 of the optical sensor 9 and the center line C1 of the exposure station 6 is equal to a sum of an integer multiple of the pitch length of the frame 2a on the negative film 2 and a half of the same, and more particularly, is set to the length of 1.5 frames in this embodiment.

The controller 12 is also connected to a keyboard 17 and a display 18.

The exposure station 6 is provided to expose each frame 2a on the negative film 2 loaded at exposure stage 6a to a beam of light for printing its image on a print paper (not shown).

There are a cartridge holder 15 for holding a film cartridge 14 and a film takeup 16 disposed on the start and finish ends of the transfer path 5 respectively.

In addition, a film cleaner 17 is provided as shown in FIG. 5 or 6.

The steps of operation of the photographic printing apparatus of Embodiment 2 now will be explained.

(1) As the negative film 2 is drawn out from its cartridge 14 and transferred forward at intervals of time, the shooting data and the latent image pattern assigned to its target frame 2a are read by the magnetic read head 7 and the optical sensor 9 respectively.

(2) Then, the negative film 2 is transferred backward in intermittent movement for printing, allowing relevant printing data to be written securely.

The written printing data are then checked with the magnetic read head 7.

If checking of the printing data is unnecessary, the write head 8 may be located downstream (the transfer inlet 3 side) of the read head 7.

EMBODIMENT 3

Embodiment 3 of the present invention is similar in the arrangement to Embodiment 2, except that the timing of the rotating movements of the motor M and the processing of scanned data controlled by the controller 12 are modified.

Figure 7:
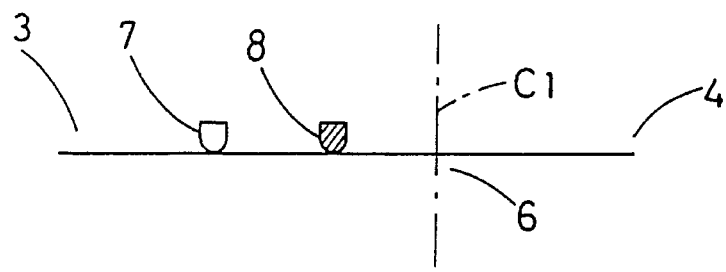
FIG. 7 is a diagram of major components in the photographic printing apparatus of Embodiment 2.

FIG. 7 is a schematic view showing this embodiment.

The operation of a photographic printing apparatus of Embodiment 3 will now be explained.

(1) As a negative film 2 is transferred forwardly from the transfer inlet 3 towards the exposure station 6 at intervals of time, its recorded data are scanned and read out.

(2) Then, the negative film 2 is transferred backwardly in continuous movement towards the inlet 3.

During the backward transfer movement, the scanned pattern data are processed and also printing data are written into the magnetic recording tracks 1 on the film 2.

(3) As the negative film 2 is transferred forwardly again towards the exposure station 6 at intervals of time, its frame images are printed.

The written printing data are examined by the read head 7.

If the checking of the written data is unnecessary, the magnetic write head 8 may be located downstream (the inlet 3 side) of the read head 7.

Since the write head 8 is actuated during the continuous backward transfer movement, its distance from the center line C1 of the exposure station 6 is not critical.

EMBODIMENT 4

Embodiment 4 of the present invention is similar in arrangement to Embodiment 1, except that the timing of the rotating movements of the motor M and the processing of scanned data controlled by the controller 12 are modified.

Figure 8:
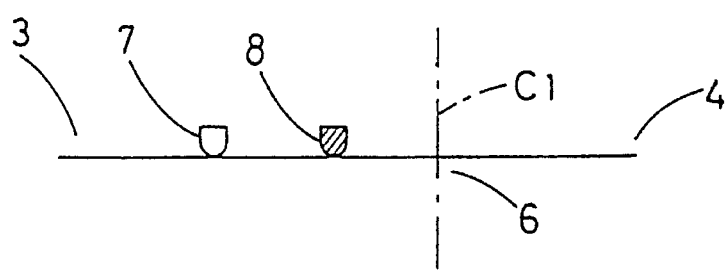
FIG. 8 is a diagram of major components in a photographic printing apparatus showing Embodiment 3 of the present invention.

FIG. 8 is a schematic view showing this embodiment.

The operation of a photographic printing apparatus of Embodiment 4 now will be explained.

(1) As a negative film 2 is transferred forwardly from the transfer inlet 3 towards the exposure station 6 at intervals of time, its recorded data are scanned and read out.

(2) Then, the negative film 2 is transferred backwardly in continuous movement towards the inlet 3.

During the backward transfer movement, the processing of the scanned pattern is completed.

(3) As the negative film 2 is transferred forwardly again towards the exposure station 6 at intervals of time, its frame images are printed and simultaneously printing data are written into the recording tracks 1 on the film 2.

The written printing data are checked by the read head 7.

If the checking of the written data is unnecessary, the magnetic write head 8 may be located downstream (the inlet 3 side) of the read head 7.

Since the write head 8 is actuated during the intermittent forward transfer movement, its distance from the center line C1 of the exposure station 6 is determined in the same manner as of Embodiment 1.

EMBODIMENT 5

Embodiment 5 of the present invention is similar in the arrangement to Embodiment 1, except that the timing of the rotating movements of the motor M and the processing of scanned data controlled by the controller 12 are modified.

Figure 9:
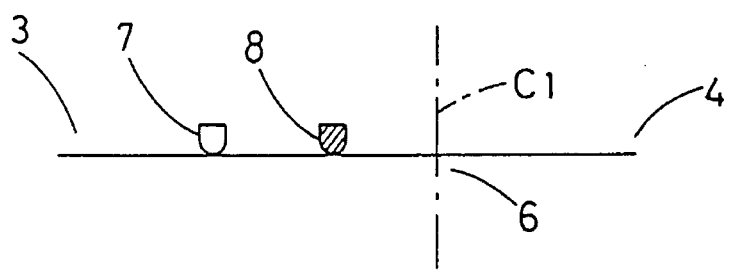
FIG. 9 is a diagram of major components in a photographic printing apparatus showing Embodiment 4 of the present invention.

FIG. 9 is a schematic view showing this embodiment.

The operation of a photographic printing apparatus of Embodiment 5 will be explained.

(1) As a negative film 2 is transferred forwardly from the transfer inlet 3 towards the exposure station 6 at intervals of time, its recorded data are scanned and read out.

(2) Then, the negative film 2 is transferred backwardly in continuous movement towards the inlet 3.

During the backward transfer movement, the processing of the scanned pattern is completed.

(3) As the negative film 2 is transferred forwardly again towards the exposure station 6 at intervals of time, its frame images are printed and simultaneously printing data are written by the write head 8 into the recording tracks 1 on the film 2.

The written printing data are checked by the read head 7.

If the checking of the written data is unnecessary, the magnetic write head 8 may be located in the downstream (the inlet 3 side) of the read head 7.

In this case, the write head 8 is actuated during the continuous backward transfer movement and its distance from the center line C1 of the exposure station 6 is not critical.

EMBODIMENT 6

Figure 10:
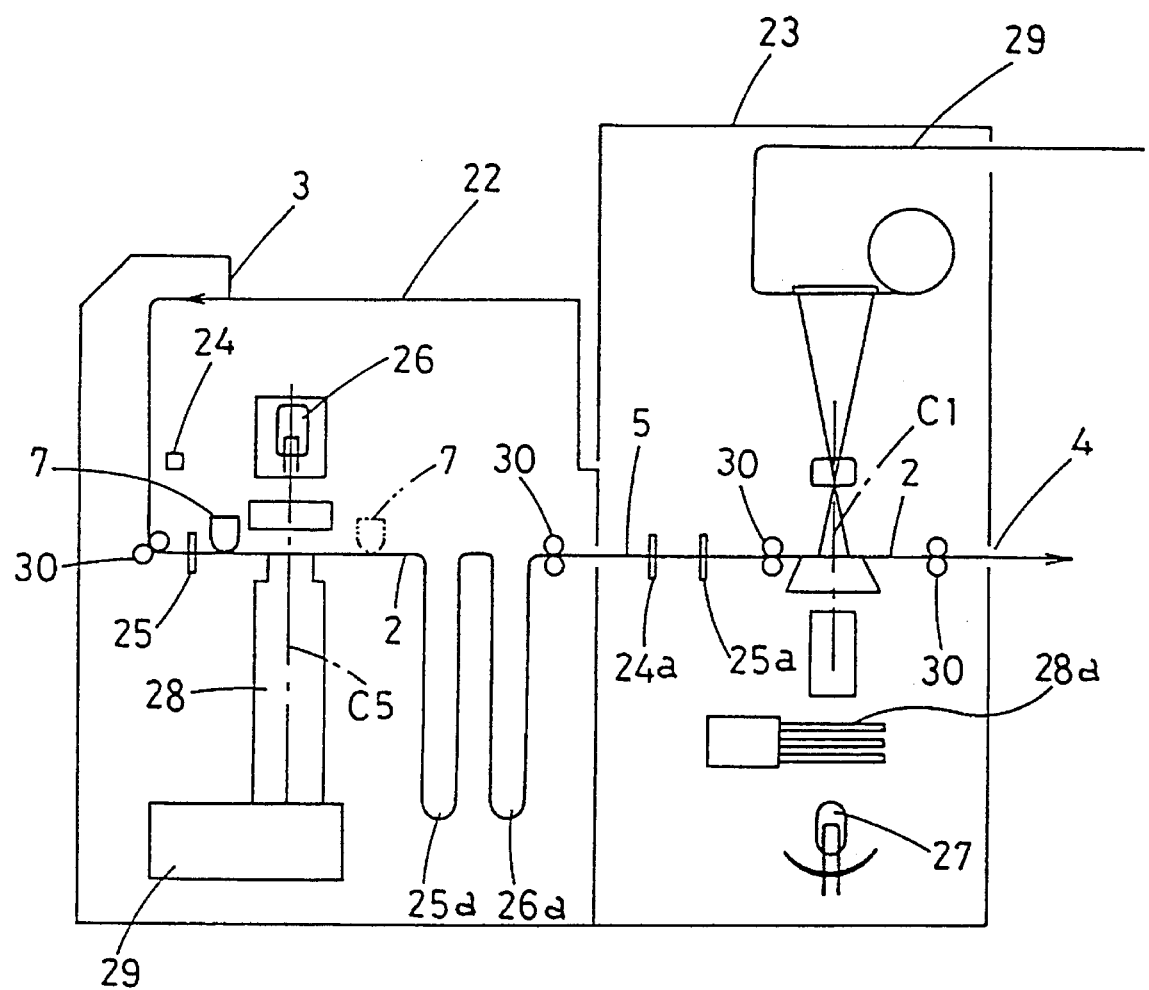
FIG. 10 is a schematic view of a photographic printing apparatus showing Embodiment 5 of the present invention.

FIG. 10 is a schematic view of this embodiment.

There are a scanner unit 22 and a printer unit 23 disposed across a transfer path 5 along which a negative film 2 having magnetic recording tracks 1 provided thereon is transferred from a transfer inlet 3 to a transfer outlet 4.

The scanner unit 22 includes a DX code detector 24 for detecting specific pattern data of a negative film 2, e.g. the size of frames and the type of a format, and an image detector 25 for detecting data of a frame by scanning with a beam of light emitted from a scanner light source 26. The printer unit 23 includes an exposure light source 27 and a color control filter 28a both actuated in response to detected data of the scanner unit 22.

The DX code detector 24 is provided for reading with its photo sensor a DX code which carries relevant information including the type of the film 2 and the frame number of the frame and is recorded on both sides of a frame on the negative film 2.

The image detector 25 measures the size of image an in a frame on the negative film 2 for identifying the location of the image.

There are a couple of loop sections 25a and 26a provided in the transfer path 5 between the scanner unit 22 and the printer unit 23.

The beam of light emitted from the scanner light source 26 is passed through a target frame image in the film 2, collimated by a lens unit 28, separated into three primary color components by a color separator filter, and received by a color sensor disposed in a light detector 29 for measuring the optical density of the frame image.

The printer unit 23 also includes a DX code detector 24a and an image detector 25a for identification of a frame to be printed.

Also denoted by 29 and 30 are print papers and transfer rollers respectively.

A magnetic read head 7 is disposed across the transfer path 5 in the scanner unit 22 for reading film data (FIG. 10).

The distance between the read head 7 and center line C5 of the scanner light source 26 is arranged equal to a sum of an integer multiple of the pitch length of one frame of the negative film 2 and a half of the same.

This allows recorded data on the negative film 2 to be read by the read head 7 without failure during intermittent forward transfer movement of the film 2 across the light source center line C5, requiring no loop section between the head 7 and the center line C5. As no loop section is needed between the head 7 and the center line C5 of the scanner light source 26, the overall size of the scanner unit 22 can be minimized.

Although the read head 7 is located upstream of the light source center line C5 in this embodiment, it may be disposed downstream of the same as denoted by the two-dot chain line in FIG. 10.

EMBODIMENT 7

Figure 11:
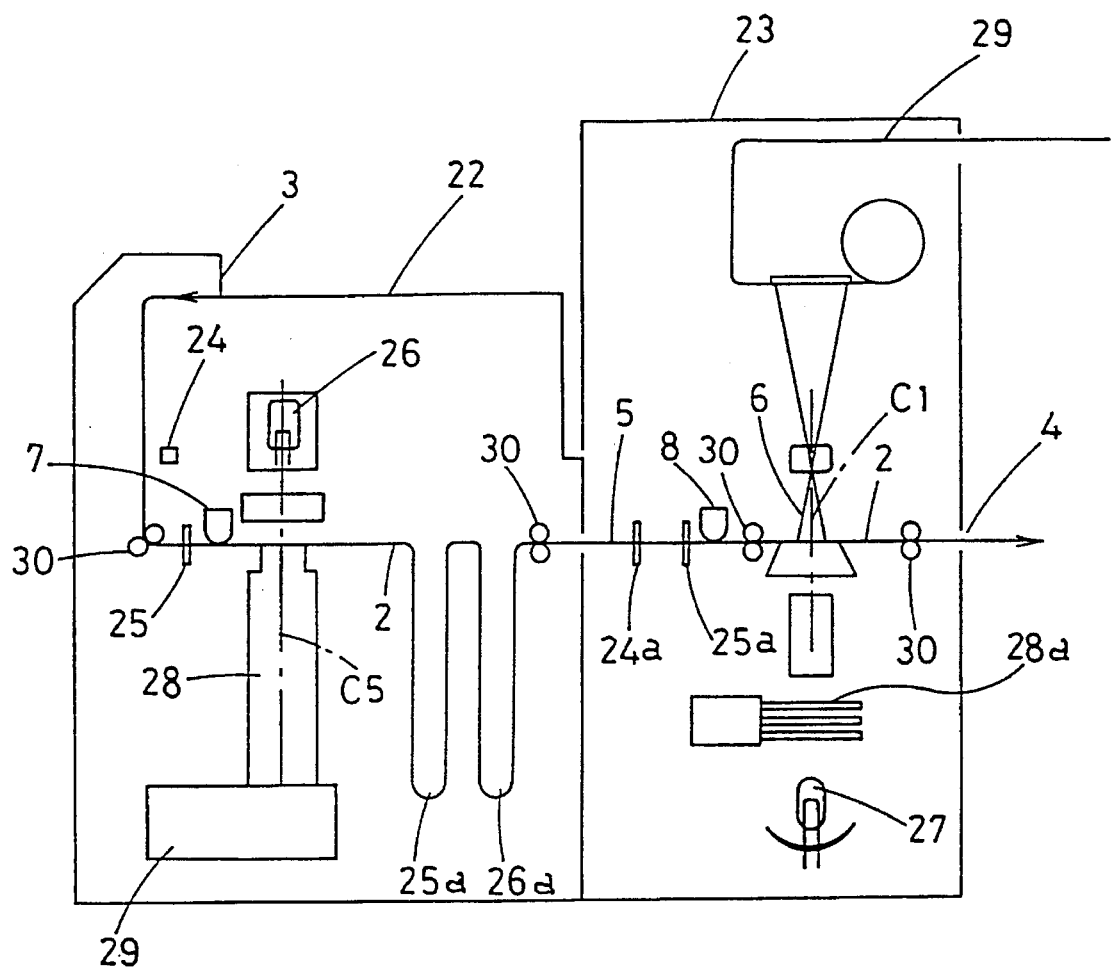
FIG. 11 is a schematic view of a photographic printing apparatus showing Embodiment 6 of the present invention.

FIG. 11 is a schematic view showing Embodiment 7 in which the arrangement of components is similar to that of Embodiment 6, except that a magnetic write head 8 is added, and will be explained in no more detail and with like components being denoted by like numerals.

The write head 8 is located across the transfer path 5 upstream of an exposure station 6 in the printer unit 23. It writes printing data of each print onto the negative film 2.

The distance between the write head 8 and the center line C1 of the exposure station 6 is arranged equal to a sum of an integer multiple of the pitch length of one frame of the negative film 2 and a half of the same. This allows the printing data of a frame to be written onto the negative film 2 by the write head 8 without failure during intermittent forward transfer movement of the film 2 towards the exposure station 6. Accordingly, no loop section is needed between the write head 8 and the center line C1 of the exposure station 6, and the overall size of the printer unit 23 can be minimized.

EMBODIMENT 8

Figure 12:
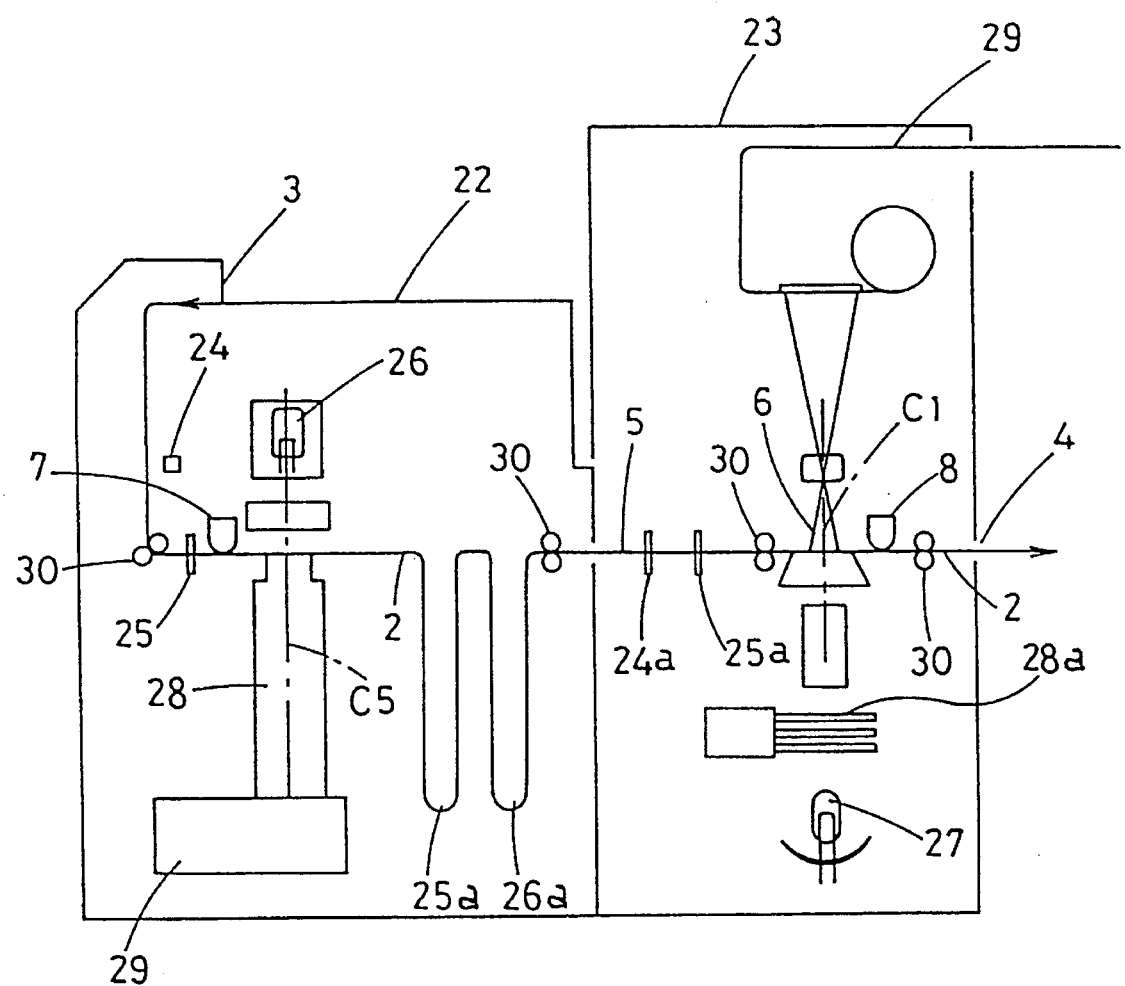
FIG. 12 is a schematic view of a photographic printing apparatus showing Embodiment 7 of the present invention.

FIG. 12 is a schematic view showing Embodiment 8 in which the arrangement of components is similar to that of Embodiment 6 except that a magnetic write head 8 is added, and will be explained in no more detail and with like components being denoted by like numerals.

The write head 8 is located across the transfer path 5 downstream of an exposure station 6 in the printer unit 23. It writes printing data and its modification of each print onto the negative film 2.

The distance between the center line C1 of the exposure station 6 and the write head 8 is arranged equal to a sum of an integer multiple of the pitch length of one frame of the negative film 2 and a half of the same. This allows the printing data of a frame to be written onto the negative film 2 with the write head 8 without failure during intermittent forward transfer movement of the film 2 across the exposure station 6. Accordingly, no loop section is needed between the center line C1 of the exposure station 6 and the write head 8, and the overall size of the printer unit 23 can be minimized.

EMBODIMENT 9

A photographic printing apparatus of Embodiment 9 of the present invention comprises a transfer path 5 for transferring from a transfer inlet 3 to a transfer outlet 4 a negative film 2 which has rows of magnetic recording tracks 1 and latent image storages 10, an exposure station 6 disposed in a midway region of the transfer path 5, and a combination of a magnetic read head 7, a magnetic write head 8, and an optical sensor 9 disposed between the inlet 3 and the exposure station 6.

Figure 13:
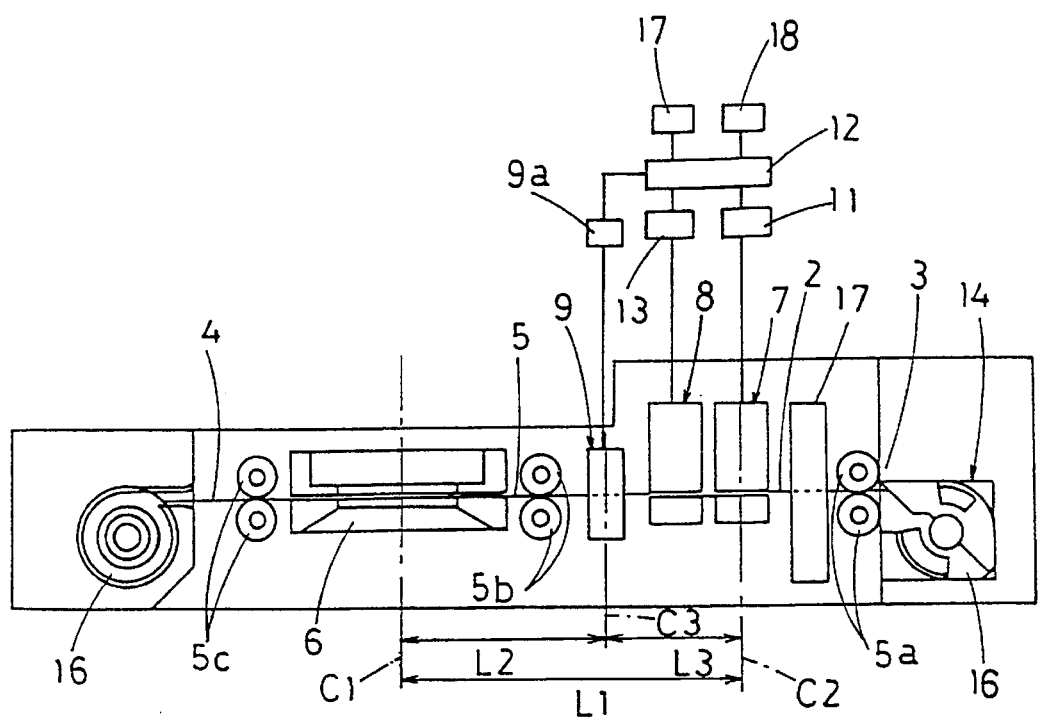
FIG. 13 is a front view of a photographic printing apparatus showing Embodiment 8 of the present invention.
Figure 14:
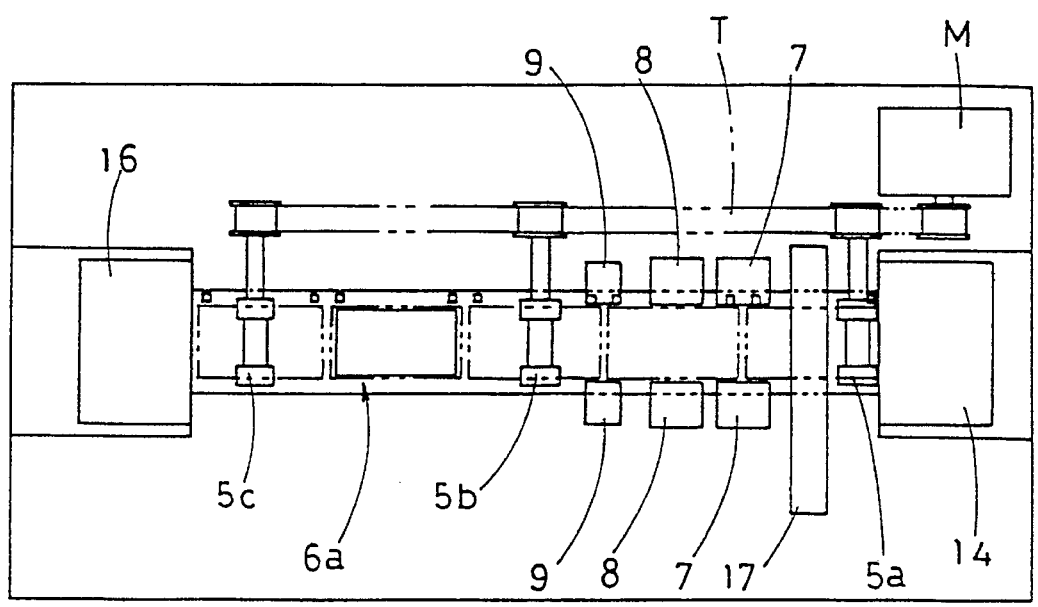
FIG. 14 is a plan view of the same.

More particularly, the read head 7, the write head 8, and the optical sensor 9 are aligned in this order from the inlet 3 (FIGS. 13 and 14).

The transfer path 5 includes a pair of transfer rollers 5a disposed adjacent to the transfer inlet 3, a pair of transfer rollers 5b disposed on the inlet 3 side of the exposure station 6, and a pair of transfer rollers 5c disposed adjacent to the transfer outlet 4.

The transfer rollers 5a, 5b, and 5c are driven by a motor M through a transmission means T for synchronous rotation.

The transfer path 5 is arranged, similar to that of Embodiment 1, in which the negative film 2 is advanced from the inlet 3 to the outlet 4 by the forward rotation of the motor M and conveyed backward from the outlet 4 to the inlet 3 by the reverse rotation of the motor M. During forward transfer movement, the negative film 2 is passed to the exposure station 6 on a frame-by-frame basis. After the negative film 2 is returned in the backward transfer movement, it is continuously conveyed towards the outlet 4 at a constant speed.

The negative film 2 is identical in construction to that shown in FIG. 4.

The magnetic read head 7 is identical to that of Embodiment 1 for reading data recorded in the magnetic recording tracks 1 on the negative film 2 and is located across the transfer path 5 between the transfer inlet 3 and the exposure station 6. The magnetic read head 7 is electrically connected by a read circuit 11 to the controller 12.

A distance L1 between the center line C2 of the read head 7 and the center line C1 of the exposure station 6 is equal to a sum of an integer multiple the pitch length of one frame on the negative film 2 and a half of the same, and more particularly, is set to a length of 2.5 frames in this embodiment.

Equally, the magnetic write head 8 is provided for writing shooting data into the magnetic recording tracks 1 on the negative film 2 and is located across the transfer path 5 between the transfer inlet 3 and the exposure station 6. The magnetic write head 8 is electrically connected by a write circuit 13 to the controller 12.

Similar to Embodiment 1, the optical sensor 9 is provided for detecting the perforations 2b and the latent image patterns 10 on the negative film 2 and is located between the read head 7 and the exposure station 6. The optical sensor 9 is electrically connected by an amplifier circuit 9a to the controller 12.

A distance L2 between the center line C3 of the optical sensor 9 and the center line C1 of the exposure station 6 is equal to a sum of an integer multiple of the pitch length of one frame on the negative film 2 and a half of the same, and more particularly, is set to a length of 1.5 frames in this embodiment. Accordingly, a distance between the center line C2 of the read head 7 and the center line C3 of the optical sensor 9 is equal to the frame pitch length.

The controller 12 is also connected to a keyboard 17 and a display 18.

The exposure station 6 is provided to expose each frame 2a on the negative film 2 loaded at exposure stage 6a to a beam of light for printing its image on a print paper (not shown).

A variation of the speed of intermittent transfer movement of the negative film 2 with time is similar to the relation between the transfer movement speed v and the time t of Embodiment 1 shown in FIG. 1. The reading of data from the recording tracks 1 and the latent image patterns 10 with the read head 7 and the optical sensor 9 respectively are executed during the period t2 where the transfer speed is constant.

There are a cartridge holder 15 for holding a film cartridge 14 and a film takeup 16 disposed on the start and finish ends of the transfer path 5 respectively.

In addition, a film cleaner 17 is provided as shown in FIG. 13 or 14.

A sequence of operations of the photographic printing apparatus of Embodiment 9 now will be explained where the recorded data is correctly read.

(1) As the negative film 2 is drawn out from its cartridge 14 and transferred forwardly at intervals of time, the shooting data and the latent image pattern assigned to its target frame 2a are read by the magnetic read head 7 and the optical sensor 9 respectively.

(2) Then, while the negative film 2 is transferred backwardly in continuous movement, modified data are written by the write head 8 into the magnetic recording track 1 of the negative film 2.

(3) As the negative film 2 is transferred forwardly again in intermittent movement for printing, the printing data is read by the read head 7 for checking whether or not it is correct.

(4) The negative film 2 is reversed again in continuous movement at a constant speed and extra data are written by the write head 8.

The extra data includes substitute data for fault data found at the step (3) or correction data.

Another sequence of operation now will be explained.

(1) As the negative film 2 is drawn out from its cartridge 14 and transferred forwardly at intervals of time, the shooting data and the latent image pattern assigned to its target frame 2a are read by the magnetic read head 7 and the optical sensor 9 respectively.

(2) Then, while the negative film 2 is transferred backwardly in continuous movement at a constant speed, the shooting data are read once more by the read head 7 and compared with the previous data read at step (1) for correctness.

(3) The negative film 2 is transferred forwardly again in intermittent movement to the exposure station 6 for printing.

(4) The negative film 2 is reversed again in continuous movement at a constant speed and extra data are written by the write head 8.

The extra data includes data for the scanner action and correction.

What is claimed is:

1. A photographic printing apparatus comprising:
   an exposure station disposed in a midway region of a transfer path between a transfer inlet and a transfer outlet along which a negative film having magnetic recording tracks provided thereon is transferred forwardly and backwardly; and
   a magnetic read head disposed between said transfer inlet and said exposure station, said magnetic read head being spaced from a center line of said exposure station by a distance which is equal to a sum of an integer multiple of the pitch length of one frame on the negative film and a half of the same.

2. A photographic printing apparatus according to claim 1, further comprising a magnetic write head disposed between said exposure station and said transfer outlet, said magnetic write head being spaced from said center line of the exposure station by a distance which is equal to a sum of an integer multiple of the pitch length of the frame on the negative film and a half of the same.

3. A photographic printing apparatus having a transfer path extending from a transfer inlet to a transfer outlet for transfer movements of a negative film which has magnetic recording tracks provided thereon and an exposure station disposed in a midway region of said transfer path, in which the negative film is scanned during intermittent forward transfer movement thereof from said transfer inlet towards said exposure station and is subjected to printing during backward transfer movement thereof towards said transfer inlet, the improvement comprising:

a magnetic read head disposed between said transfer inlet and said exposure station, said magnetic read head being spaced from a center line of said exposure station by a distance which is equal to a sum of an integer multiple of the pitch length of one frame on the negative film and a half of the same.

4. A photographic printing apparatus according to claim 3, further comprising a magnetic write head disposed between said transfer inlet and the exposure station, said magnetic write head being spaced from said magnetic read head by a distance which is equal to a sum of an integer multiple of the pitch length of the frame on the negative film and a half of the same.

5. A photographic printing apparatus according to claim 4, wherein said magnetic write head is located upstream of said magnetic read head relative to the backward transfer movement.

6. A photographic printing apparatus having a transfer path extending from a transfer inlet to a transfer outlet for forward and backward transfer movements of a negative film which has magnetic recording tracks provided thereon and an exposure station disposed in a midway region of said transfer path, in which the negative film is scanned during its intermittent forward transfer movement from said transfer inlet towards said exposure station and resultant scanned data are processed to the end during the continuous backward transfer movement of the negative film towards said transfer inlet before the negative film being once again transferred forwardly in intermittent movement to said exposure station for printing, the improvement comprising:

a magnetic read head disposed between said transfer inlet and said exposure station, said magnetic read head being spaced from a center line of said exposure station by a distance which is equal to a sum of an integer multiple of the pitch length of one frame on the negative film and a half of the same.

7. A photographic printing apparatus according to claim 6, further comprising a magnetic write head disposed between said transfer inlet and the exposure station for writing of data onto the negative film during the continuous backward transfer movement of the same.

8. A photographic printing apparatus according to claim 7, wherein said magnetic write head is located upstream of said magnetic read head relative to the backward transfer movement.

9. A photographic printing apparatus according to claim 6, further comprising a magnetic write head disposed between said the transfer inlet and the exposure station for writing of data onto the negative film during the continuous forward transfer movement of the same, said magnetic write head being spaced from said magnetic read head by a distance which is equal to a sum of an integer multiple of the pitch length of the frame on the negative film and a half of the same.

10. A photographic printing apparatus according to claim 9, wherein said magnetic write head is located upstream of said magnetic read head relative to the forward transfer movement.

11. A photographic printing apparatus having a transfer path extending from a transfer inlet to a transfer outlet for forward and backward transfer movements of a negative film which has magnetic recording tracks provided thereon and an exposure station disposed in a midway region of said transfer path, in which the negative film is scanned during its intermitted forward transfer movement from said transfer inlet towards said exposure station and resultant scanned data processed to the end during the continuous backward transfer movement of the negative film towards said transfer inlet before the negative film being once again transferred forwardly to said exposure station for printing and then, backwardly towards said transfer inlet in continuous movement, the improvement comprising:

a magnetic read head disposed between said transfer inlet and said exposure station for reading data from the recording tracks on the negative film during the intermittent backward transfer movement of the negative film, said magnetic read head being spaced from a center line of said exposure station by a distance which is equal to a sum of an integer multiple of the pitch length of one frame of the negative film and a half of the same.

12. A photographic printing apparatus according to claim 11, further comprising a magnetic write head disposed between said transfer inlet and the exposure station for writing of data, after the printing, onto the negative film during the continuous backward transfer movement of the same.

13. A photographic printing apparatus according to claim 12, wherein said magnetic write head is located upstream of said magnetic read head relative to the backward transfer movement.

14. A photographic printing apparatus having a scanner unit and a printer unit disposed in this order from an upstream direction along a transfer path extending from a transfer inlet to a transfer outlet for transfer movements of a negative film which has magnetic recording tracks provided thereon, said scanner unit including a detector for detecting film mode data of the size of frames and the film type, and another detector for detecting frame image data by scanning with a scanner light source, and said printer unit including a printer light source and a light control filter for color adjustment which are actuated by means of detected data of said scanner unit for printing at an exposure station, the improvement comprising:

a magnetic read head disposed across said transfer path in said scanner unit, said magnetic read head being spaced from a center line of said scanner light source by a distance which is equal to a sum of an integer multiple of the pitch length of one frame on the negative film and a half of the same.

15. A photographic printing apparatus according to claim 14, further comprising a magnetic write head disposed across said transfer path upstream of an exposure station in said printer unit, said magnetic write head being spaced from a center line of said exposure station by a distance which is equal to a sum of an integer multiple of the pitch length of the frame on the negative film and a half of the same.

16. A photographic printing apparatus according to claim 14, further comprising a magnetic write head disposed across said transfer path downstream of an exposure station in said print unit, said magnetic write head being spaced from a center line of said exposure station by a distance which is equal to a sum of an integer multiple of the pitch length of the frame on the negative film and a half of the same.

17. A photographic printing apparatus having a transfer path extending from a transfer inlet to a transfer outlet for forward and backward transfer movements of a negative film which has a magnetic recording track and a latent image pattern provided and assigned to each frame thereon and an exposure station disposed in a midway region of said transfer path, the improvement comprising:

a magnetic read head;

a magnetic write head;

an optical sensor;

said magnetic read head, magnetic write head, and optical sensor being disposed across said transfer path in this order from said transfer inlet;

said magnetic read head being spaced from a center line of said exposure station by a distance which is equal to a sum of an integer multiple of the pitch length of the frame on the negative film and a half of the same, where the negative film is scanned and read by said optical sensor and said magnetic read head for acquisition of data during its intermittent forward transfer movement towards said transfer outlet and is written thereon by said magnetic write head for storage of data in its magnetic recording tracks during its continuous backward transfer movement towards said transfer inlet.

* * * * *